Feb. 18, 1958 J. T. KELLY ET AL 2,824,151
ALKYLATION PROCESS
Filed April 30, 1956
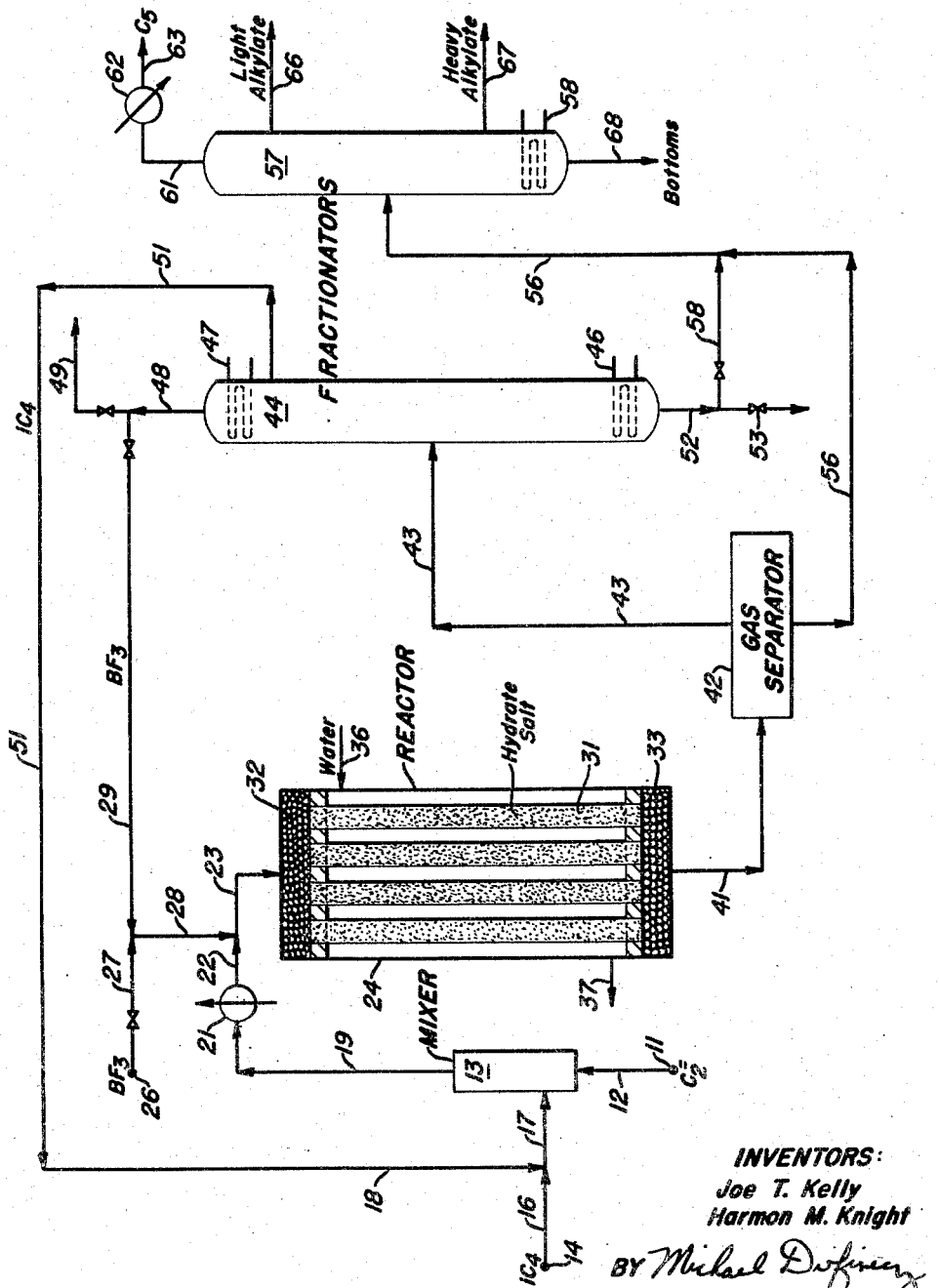
INVENTORS:
Joe T. Kelly
Harmon M. Knight
BY Michael Definey
ATTORNEY

2,824,151
ALKYLATION PROCESS

Joe T. Kelly, Dickinson, and Harmon M. Knight, La Marque, Tex., assignors to The American Oil Company, Texas City, Tex., a corporation of Texas Application April 30, 1956, Serial No. 581,506

14 Claims. (Cl. 260—683.44)

This invention relates to the reaction of isoparaffins or aromatic hydrocarbons and olefins. More particularly it relates to the alkylation of isobutane with ethylene.

In the petroleum industry today, the octane race has placed a strain on facilities and materials needed to make gasoline meeting present day automotive engine requirements. One of the remaining sources of high octane components is the product of the alkylation of isobutane and ethylene. This alkylation is not easy to carry out, particularly on a large scale.

An object of the invention is the alkylation of isoparaffins, particularly isobutane, with olefins, particularly ethylene. Another object is the alkylation of aromatic hydrocarbons with olefins. Other objects will become apparent in the course of the detailed description.

The alkylation of isoparaffins or aromatic hydrocarbons with olefins is carried out in the presence of a novel catalyst pair. One member of the catalyst pair is boron trifluoride. The other member of the catalyst pair is a metal stannate hydrate, that is, a metal stannate salt containing water of hydration. Although the second component of the catalyst pair is spoken of as a metal stannate hydrate, it is believed that the solid member is more properly a complex of the hereinafter defined metal stannate hydrate and $BF_3$; the $BF_3$ is believed to complex with some or all of the hydrate water present in the metal stannate hydrate salt. More than the amount of $BF_3$ needed to complex the water of hydration is necessary to obtain the desired catalystic effect.

Boron trifluoride is one member of the catalyst pair. Commercial grade anhydrous boron trifluoride is suitable for use as one member of the catalyst pair.

The other member of the catalyst pair, hereinafter spoken of as the solid member, is a metal stannate hydrate, i. e., a metal stannate salt containing water of hydration. The salt may be used as a fine powder, as pellets, or may be supported on a solid carrier such as alumina, charcoal, silica gel, etc. Not all metal stannates which contain water of hydration are suitable, nor are all metal ions suitable. The particular metal ion components of the stannate salt hydrates are bismuth, cadmium, calcium, cobaltous, ferric, magnesium, manganous, and nickelous. In determining the effective members, it has been considered that the catalyst pairs which did not product a yield, on a weight percent basis on ethylene charged, when isobutane and ethylene were contacted, of 100% or more, were unsuitable.

It is necessary that the above-defined metal stannate salts contain hydrate water. The anhydrous salts do not have any promotional effect on the activity of $BF_3$. In those cases wherein a salt may exist in forms having various amounts of water of hydration present, it is not necessary that any particular hydrate be used. Apparently it is necessary only that some water of hydration be present.

The $BF_3$ and the defined salt react to form a solid material containing complexed $BF_3$. When the salt hydrate and $BF_3$ are contacted in a closed vessel, the $BF_3$ partial pressure drops very rapidly at first and then gradually approaches a constant value. It appears that a very rapid reaction between the $BF_3$ and some of the water of hydration takes place. This initially rapid reaction is then followed by a relatively slow reaction between the remaining molecules of hydrate water and additional $BF_3$. It appears that when the salt hydrate is exposed to $BF_3$, even in the presence of hydrocarbon reactants, eventually all of the water of hydration will become associated with $BF_3$ on about a 1 mole of $BF_3$ per mole of hydrate water basis.

A complex of the defined salt hydrate and $BF_3$ is not an effective catalyst for the alkylation in the absence of free-$BF_3$. Free-$BF_3$ is to be understood as $BF_3$ existing in the reaction zone which is not complexed with the defined metal stannate-hydrate. As soon as the salt hydrate has complexed with some $BF_3$, the beneficial catalytic effect exists. Thus free-$BF_3$ may exist in the reaction zone, as evidenced by the formation of alkylate, even though all of the hydrate water has not been complexed. In a batch system, wherein less $BF_3$ is present than is theoretically required to complex all the water of hydration present in the salt hydrate, eventually no alkylation will occur as charge is added, since all of the $BF_3$ will become complexed.

In general, the process is carried out utilizing an amount of $BF_3$ which is in excess of that required to complex with all the hydrate water present in the contacting zone, namely, in excess of about 1 mole of $BF_3$ per mole of hydrate water present. More than the minimum amount of free-$BF_3$ is beneficial, in fact, the yield of alkylate increases rapidly with increase in free-$BF_3$ present, up to a maximum amount. The amount of free-$BF_3$ used is dependent somewhat upon the reactants themselves. However, when reacting isoparaffins and olefins, the free-$BF_3$ usage is desirably, set out on a $BF_3$ to olefin weight ratio, of at least about 0.2. In other words, at least about 0.2 lb. of free-$BF_3$ per lb. of olefin charged to the alkylation zone is desirable. About 1.5 parts by weight of $BF_3$ per part of olefin charged appears to be about the desirable maximum usage of $BF_3$. It is preferred to use between about 0.35 and 1 part by weight of free-$BF_3$ per part by weight of olefin when utilizing the lower molecular weight olefin, such as ethylene and propylene.

The process may be carried out at any temperature below the temperature at which the salt hydrate decomposes, that is, loss of all its water of hydration. The temperatures of operation may be as low as —20° C. or even lower. Temperatures as high as 150° C. and even higher may be used with some of the salt hydrates which have relatively high decomposition temperatures. More usually the temperature of operation will be between about 0° C. and 100° C. Lower temperatures appear to favor the formation of the hydrocarbons having 6 to 7 carbon atoms. It is preferred to operate at a temperature between about 25° C. and 40° C.

Sufficient pressure is maintained on the system to keep a substantial portion of the hydrocarbons charged in the liquid state. The process may be carried out at relatively low pressures, for example, 100 p. s. i., or it may be carried out at elevated pressures, for example, 2000 p. s. i., or more. In general, pressures will be between about 200 and 1000 p. s. i. and preferably between about 300 and 600 p. s. i.

The contacting of the isoparaffin or aromatic hydrocarbon and the olefin in the presence of the defined catalyst pair is continued until an appreciable amount of alkylate has been formed. In batch reactions, it is possible to virtually extinguish the olefin, i. e., convert essentially 100% of the olefin by a sufficiently long period of contacting. When operating in a continuous flow system, it may be desirable to have a time of contacting such that substantial amounts of olefins are not converted and obtain the complete conversion of the olefin by a recycle operation. The time of reaction will be determined by the type of hydrocarbons charged, the ratio of isoparaffin or aromatic to olefin, the degree of mixing in the contacting zone and the catalyst usage. A few tests will enable one to determine the optimum time of contacting for the particular system of operating conditions being tried.

The reactants in the hydrocarbon charge to the alkylation process are isoparaffin, or aromatic and olefin. The olefin contains from 2 to about 12 carbon atoms. Examples of suitable olefins are ethylene, propylene, butene-2, hexene and octene; in addition to these, the olefin polymers obtained from propylene and/or butylene are also suitable for use in the process, such as codimer, propylene trimer, propylene tetramer and butylene trimer. It is preferred to operate with ethylene or propylene.

The aromatic hydrocarbons must be alkylatable by the particular olefin used. It is self-evident that an aromatic hydrocarbon which contains alkyl substituents positioned so that steric hindrance would prevent or greatly reduce the possibility of alkylation with the particular olefin should not be subjected to the process. Examples of particularly suitable aromatic hydrocarbons are benzene, toluene, xylene, trimethylbenzenes, and the other alkyl analogues, such as propyl and butyl; the naphthalene aromatic hydrocarbons, such as the mono and disubstituted methylnaphthalenes.

The isoparaffin reactant is defined as a paraffinic hydrocarbon which has a tertiary hydrogen atom, i. e., paraffins which have a hydrocarbon atom attached to a tertiary carbon atom. Examples of these are isobutane, isopentane (2-methylbutane), 2-methylpentane, 2-methylhexane, 3-methylhexane, 2,3,-dimethylbutane (di-isopropyl) and 2,4-dimethylhexane. Thus the isoparaffins usable as one reactant in the process contain from 4 to 8 carbon atoms.

In the isoparaffin-olefin system, the alkylation reaction is more favored as the mole ratio of isoparaffin to olefin increases. In general, the isoparaffin to olefin mole ratio in the hydrocarbon charge should be at least 1. More than this amount is good and it is desirable to have an isoparaffin to olefin ratio between about 2 and 25 and in some cases more, for example, as much as 50. It is preferred to operate with an isoparaffin to olefin mole ratio of between about 5 and 15.

The presence of non-reactive hydrocarbons in the hydrocarbon charge is not detrimental unless the reactants become excessively diluted. For example, the isoparaffin may also contain isomers of the normal configuration. The olefins may contain paraffins of the same carbon number. Mixtures of 2 or more isoparaffins or 2 or more aromatic hydrocarbons, or 2 or more olefins may be charged. In general, when a particular product distribution is desired, it is preferable to operate with a single isoparafin and a single olefin, for example, technical grade isobutane and ethylene, both of about 95% purity.

The reactants may be mixed together before they are charged into the reactor. Or, they may be charged into the reactor separately. Or, a portion of the olefin may be blended with the isoparaffin or aromatic before introduction into the reactor and the remainder of the olefin injected into the reactor. The charge may be introduced all at one point into reactor or it may be introduced at 2 or more points. The alkylation reaction is somewhat exothermic and temperature control is facilitated by introducing the olefin into the reactor at more than one point.

The $BF_3$ member of the catalyst pair may be premixed with the isoparaffin and olefin before introducing these into the reactor but this should not be done when an extremely reactive system such as isobutanes and isobutylene or aromatic hydrocarbons and olefins are being used; or when an olefin that is very rapidly polymerizable is being used. The $BF_3$ may be blended with the isoparaffin reactant and introduced into the reactor with this member when the isoparaffin and the olefins are being introduced separately. The $BF_3$ may also be introduced directly into the reaction zone independently from the hydrocarbons charged. The $BF_3$ may be introduced into the reactor at a single point or at several points to help control temperature and reaction rate.

The reactor may be a vessel providing a batch-type reaction, i. e., one wherein the desired amount of isoparaffin or aromatic and olefin are charged to a closed vessel containing the catalyst pair and the vessel then maintained at the desired temperature for the desired time. At the end of this time, the hydrocarbon product mixture and unreacted materials are withdrawn from the vessel and processed to separate the alkylate product from the unreacted materials and lower and higher molecular weight materials. The reactor may be a fixed bed operation wherein the reactants and free-$BF_3$ are flowed through the bed of the hydrate salt member of the catalyst pair, the space velocity being controlled so that the desired amount of reaction is obtained during the passage of the reactants through the bed of hydrate salt. Under some conditions, a moving bed of hydrate salt may be utilized. In still another set of circumstances, a fluidized bed of hydrate salt may be utilized with the incoming stream of reactants providing the energy for the fluidization of the solid hydrate salt. Other methods of operation common in the catalytic refining aspects of the petroleum industry utilizing solid catalyst may be readily devised.

It has been pointed out that the solid member of the catalyst pair is really a complex of the metal stannate-salt hydrate and $BF_3$; the $BF_3$ apparently reacting with the water of hydration. The complex may be preformed, by exposing the salt hydrate to $BF_3$ for a time sufficient to introduce some $BF_3$ into the solid component or even enough to complex all of the water of hydration; this being done before the reactants are introduced into the reaction zone or even before the solid member of the catalyst pair is positioned in the reaction zone. The complex may be formed in situ during a batch-type reaction. In the batch-type operation, it is convenient to introduce all the $BF_3$ into the reaction vessel at once. This amount of $BF_3$ is sufficient not only to complex with the water of hydration but also provide the desired amount of free-$BF_3$. In a flow system, the solid member may be prepared in situ by charging fresh hydrate salt to the reaction zone and forming the complex during the initial passage of reactants and $BF_3$ over the salt hydrate. Some alkylation reaction occurs even though the salt hydrate has not taken up sufficient $BF_3$ to complex all the water of hydration. As the flow of reactants and $BF_3$ continues over the solid member, eventually the salt hydrate will become saturated with respect to $BF_3$. At this time, the amount of $BF_3$ introduced into the reaction zone should be cut back to that amount of free-$BF_3$ desired, under this particular set of operating conditions.

The illustrative embodiment set out in the annexed figure forms a part of this specification. It is pointed out that this embodiment is schematic in nature, that many items of process equipment have been omitted, since these may be readily added by those skilled in this art and that this embodiment is only one of many which may be devised, and that the invention is not to be limited to this particular embodiment.

In this embodiment, it is desired to produce a high yield of di-isopropyl for use as a blending material for gasoline. Ethylene from source 11 is passed by way of line 12 into mixer 13. Liquid isobutane from source 14 is passed by way of lines 16 and 17 into mixer 13. Both the ethylene and the isobutane are about 90% purity, the remainder being n-butane and ethane, with trace amounts of other components found in materials derived from petroleum refining sources. Mixer 13, in this instance, is a simple orifice-type mixer suitable for intermingling a liquid and a gas, or two liquids. Recycle isobutane from line 18 is passed by way of line 17 into mixer 13. In this embodiment, the molar ratio of isobutane to ethylene is 6.

From mixer 13, the blend of isobutane and ethylene is passed by way of line 19, through heat exchanger 21, where the temperature of the blend is adjusted to 30° C. The temperature of the blend leaving exchanger 21 is somewhat lower than the reaction temperature, since there is a heat rise in the reactor due to exothermic reaction. From exchanger 21, the stream of isobutane and ethylene is passed by way of lines 22 and 23 into the top of reactor 24.

Boron trifluoride is passed from source 26 by way of valved line 27 and line 28 into line 23, where it meets the stream of isobutane and ethylene. If desirable, a mixer may be introduced into line 23 to insure complete intermingling of the $BF_3$ and the hydrocarbon charged. Recycle $BF_3$ is introduced from line 29 by way of lines 28 and 23. In this embodiment, the salt hydrate is completely complexed with respect to $BF_3$ and only the necessary free-$BF_3$ is introduced by way of line 28. The weight ratio of free-$BF_3$ from line 28 to ethylene present in line 23 is 1.1.

Reactor 24 is shown as a shell and tube type vessel. Hydrate salt is contained in the tubes 31. The alumina balls 32 and 33 are positioned above and below the headers in the reactor to maintain the hydrate salt within the tubes. In order to maintain the temperature in the reactor at substantially 35° C., water is introduced into the shell side by way of line 36 and is withdrawn by way of line 37.

In this embodiment, the reactor was charged with $CoSnO_3 \cdot 2H_2O$. The hydrate salt was preformed into pellets about one-eighth inch in diameter and about one-eighth inch in height. Some silica was present to act as a lubricant in the extrusion of the pellets. The salt hydrate was contacted with $BF_3$ in an amount such that all of the water of hydration was complexed with $BF_3$. This operation was carried out before reactants were introduced into the reactor. The reactor pressure was maintained at 600 p. s. i. This permits maintaining the isobutane and substantially all of the ethylene in the liquid state.

The product hydrocarbon mixture is passed out of reactor 24 by way of line 41. This stream contains the alkylate product, unreacted isobutane, a small amount of unreacted ethylene and pentanes as well as $BF_3$. The stream from line 41 is passed into gas separator 42 where the $BF_3$, isobutane, some pentanes and some alkylate product are taken overhead by way of line 43. The material taken overhead from the separator 42 is passed into fractionator 44.

Fractionator 44 is adapted to separate the $BF_3$ as a gas, the isobutane as a liquid and the higher boiling materials as a bottoms product. Fractionator 44 is provided with an internal reboiler 46 and an internal condensor 47. $BF_3$ and unreacted ethylene are taken overhead from fractionator 44 by way of line 48 and may be passed out of the system by way of valved line 49. The material from line 49 may be periodically passed to a $BF_3$ purification operation to remove non-condensable inert gases which build up in the system. Ordinarily the stream from line 48 is recycled by way of valved lines 29 and lines 28 and 23 to reactor 24.

Isobutane is withdrawn as a liquid stream by way of line 51 and is recycled by way of lines 18 and 17 to mixer 13 for reuse in the process. Bottoms product from fractionator 44 is withdrawn by way of line 52 and may be passed to storage or further processing by way of valved line 53. This stream from line 52 consists substantially of isopentane. Some unsaturated $C_5$ hydrocarbons are also present and also a small amount of higher boiling alkylate material.

The liquids separated in gas separator 42 are passed by way of line 56 into fractionator 57. The bottoms product from fractionator 44 may be passed by way of valved line 58 and line 56 into fractionator 57 for complete removal of the alkylate material. In this embodiment, the bottoms are passed to fractionator 57.

Fractionator 57 is provided with an internal reboiler 58 and is adapted to produce the desired alkylate products from the hydrocarbon product mixture entering from line 56. A vapor stream is taken overhead by way of line 61, is condensed in cooler 62 and is passed to storage by way of line 63. The material from line 63 consists substantially of isopentane and some unsaturated $C_5$ material. This material may be used as a high octane blending stock for the production of motor gasoline of the desired volatility characteristics.

The alkylate product herein is considered to be that boiling above the pentane range and boiling below the maximum temperature usable in motor gasoline. In general, a 415° F. endpoint alkylate is blendable into motor gasoline without adverse effect in a specification calling for a 400° F. gasoline endpoint. Thus the alkylate product is considered to be the material boiling between about the lower limit of the hexane range and 415° F. in the ASTM distillation procedure.

A considerable difference exists between the octane number of the $C_6$ fraction of the alkylate product and the higher boiling material. The $C_6$ fraction, which boils from about 110° to 170° F., has an F–1 octane number of 101. The $C_7+$ material has an octane number which ranges between about 75 and 85, depending somewhat on the fractionation.

Light alkylate, which includes all the $C_6$ material and some of the $C_7$ material, is withdrawn from fractionator 51 by way of line 66. Heavy alkylate, which includes most of the $C_7$ and material boiling up to 415° F. is withdrawn from fractionator 57 by way of line 67. A small amount of higher boiling bottoms is withdrawn by way of line 68.

In general, the $C_6$ fraction of the alkylate product will contain from about 86 to about 90 mole percent of diisopropyl (2,3-dimethylbutane). 2-methylpentane and 3-methylpentane represent substantially the remainder of the $C_6$ product. Generally, only trace amounts of n-hexane are present.

The results obtainable by the process of the instant invention are set out in numerous illustrative runs below. These runs not only illustrate the types of metal stannate hydrates which are suitable but also illustrate the effects of change in operating conditions.

In Tables I, II, and III, there are set out results in the testing of various metal stannate hydrates by means of batch operation. In these runs, the tests were carried out under what are more or less standard conditions, namely, a 4-liter carbon steel bomb was dried overnight in a stream of hot air at 110° C. The stannate to be tested (90 grams) was charged to the bomb as a powder and the bomb was evacuated. One kilogram of a dry blend of ethylene and isobutane was added and then $BF_3$ (90 grams) was pressured in. The charged bombs were placed in a rocker and allowed to rock for 20 hours. At the end of this time a liquid sample was drawn through a bomb containing activated alumina (to remove dissolved $BF_3$ and salt particles). This sample was submitted for Podbielniak distillation. A $C_6$ cut from the Podbielniak distillation was analyzed by mass spectrometer. In some cases after sampling, the remaining major portion of the product was debutanized on an Oldershaw column and then fractionated on a packed column.

In Table I, data are set out showing the importance of water of hydration in the system. In run No. 1, the operation was carried out as described above except that no salt was present in the bomb. The results show that only 34% of depentanized alkylate product was obtained by the use of $BF_3$ alone as the catalyst. Run No. 2, carried out with nickelous stannate in the anhydrous form, produced no more alkylate than did $BF_3$ in the absence of stannate. Run No. 3, wherein nickelous stannate.$2H_2O$ and $BF_3$ were present, produced a depentanized alkylate product yield of 139% based on ethylene charged and resulted in the conversion of 84% of the ethylene charged.

In Table No. II, there are set out the results of testing various metal stannate hydrates. These data were obtained under the approximate standard conditions utilized in bomb work. These standard conditions are approximately: Isobutane-ethylene mole ratio, 2.4; hydrocarbon/salt weight ratio, 11; $BF_3$/ethylene weight ratio, 0.7; 20 hours' contacting time, temperature range, 20–35° C. and an initial pressure of about 350 p. s. i. g. These runs show that $CoSnO_3.2H_2O$ is outstanding amongst the stannates. The difference between $FeSnO_3.3H_2O$ and $Fe_2(SnO_3)_3.3H_2O$ is surprising. Other effective stannates are $Bi_2(SnO_3)_3.5H_2O$, $CdSnO_3.3H_2O$, $CaSnO_3.H_2O$, $MgSnO_3.3H_2O$, $MnSnO_3.3H_2O$ and $NiSnO_3.2H_2O$.

Although mercuric stannate $.xH_2O$ appears to be ineffective as an alkylation catalyst, analysis of the product hydrocarbon mixture plus the high ethylene conversion shows that this salt is an excellent ethylene polymerization catalyst in conjunction with $BF_3$.

TABLE I
*Presence of water of hydration*

| Run No | 1 | 2 | 3 |
|---|---|---|---|
| Stannate | None | [2]$NiSnO_3$ | $NiSnO_3.2H_2O$ |
| Conditions: | | | |
| Isobutane/Ethylene (Molar) | 3.0 | 2.7 | 3.6 |
| Hydrocarbon/Salt (weight) | | 11.4 | 11.1 |
| $BF_3$/Ethylene (weight) | 0.7 | 0.5 | 0.9 |
| Time, Hours | 20 | 20 | 20 |
| Temperature, °C | 25–35 | 15–25 | 25–35 |
| Pressure (Range), p. s. i. g | 300 | 270–235 | 365–180 |
| Results: | | | |
| Alkylate (Depentanized) [1] (wt. percent)— | | | |
| Hexanes | 21 | 10 | [3] 87 |
| $C_7+$ | 13 | | 52 |
| Total | 34 | 10 | 139 |
| Ethylene Converted, Percent | | | 84 |

[1] Podbielniak and mass spectrometer analyses, based on ethylene charged.
[2] Oven dried at 550° C. to remove hydrate water.
[3] 94% 2,3-dimethylbutane.

RUN NO. 18

In Run No. 18, toluene was reacted with ethylene using cobaltous stannate.$3H_2O$ and $BF_3$ as the catalyst pair. The reaction was carried out in a one gallon stirred monel autoclave. To the autoclave were charged 1581 grams of C. P. toluene, 90 grams of the salt and 103 grams of $BF_3$. Over a period of 4 hours, 153 grams of technical grade ethylene (95% $C_2$=) were added to the autoclave. The contents of the reactor were stirred for an additional half hour before settling and removal of the hydrocarbon materials. The conditions and results are set out in Table III. Infrared analysis of the ethyltoluene fraction showed that the product distribution was very different from equilibrium. The ethyltoluene isomer distribution was about: Ortho, 46%, meta, 29%, and para, 25%. This distribution indicates that this particular catalyst pair is particularly suitable for the preparation of ethyltoluene when raw material for the production of phthalic anhydride is the chief want.

TABLE III

| Run No | 56 |
|---|---|
| Stannate | $CoSnO_3.3H_2O$ |
| Reaction conditions: | |
| Time (Hours) | 3 |
| Pressure (p. s. i. g.) | 180–300 |
| Temperature (° C.) | 30 |
| Toluene/Salt (Weight) | 17.6 |
| Toluene/Ethylene (Molar) | 3.3 |
| $BF_3$/Ethylene (Weight) | 0.7 |
| Yields (on toluene converted): | |
| Ethyltoluene (Mole Percent) | 42.6 |
| C-11 Aromatics (Mole Percent) [1] | 1.6 |
| C-12+ Products (Wt. Percent) | 14.9 |
| Toluene Converted | 17.8 |
| Ethylene Converted [2] | 30 |

[1] Infrared could not distinguish between mono-butyl and diethyltoluene.
[2] Approximate—based on pressure drop.

We claim:

1. An alkylation process comprising contacting (a) an alkylatable feed hydrocarbon from the class consisting of (1) isoparaffin having from 4 to 8 carbon atoms and (2) aromatic hydrocarbon and (b) an olefin having from 2 to 12 carbon atoms, in the presence of a catalyst comprising essentially (i) a metal stannate salt containing water of hydration, the metal ion of said salt being from the class consisting of bismuth, cadmium, calcium, cobaltous, ferric, magnesium, manganous and nickelous, and (ii) $BF_3$, said $BF_3$ being present in an

TABLE II
*Various stannate hydrates*

| Run No | 4 | 5 | 6 | 7 | 8 | 9 | 10 |
|---|---|---|---|---|---|---|---|
| Metal Ion Present | Barium $^{2+}$ | Beryllium $^{2+}$ | Bismuth $^{3+}$ | Cadmium $^{2+}$ | Calcium $^{2+}$ | Cobalt $^{2+}$ | Copper $^{2+}$ |
| Moles of Water of Hydration | 3 | 3 | 5 | 3 | 3 | 3 | 3 |
| Ethylene Converted, Percent | 51 | | 89 | 77 | 70 | 79 | 45 |
| Alkylate (Wt. Percent) [1]: | | | | | | | |
| Isopentane | | | | | 12 | | |
| Hexanes | 23 | 20 | 38 | 43 | 48 | 56 | 61 |
| $C_7+$ | 17 | | 99 | 63 | 75 | 100 | 10 |
| Total ($C_5$ Free) | 40 | 20 | 137 | 106 | 123 | 156 | 71 |

| Run No | 11 | 12 | 13 | 14 | 15 | 16 | 17 |
|---|---|---|---|---|---|---|---|
| Metal Ion Present | Ferrous $^{2+}$ | Ferric $^{3+}$ | Mercury $^{2+}$ | Magnesium $^{2+}$ | Manganese $^{2+}$ | Nickel $^{2+}$ | Lead $^{2+}$ |
| Moles of Water of Hydration | 3 | 3 | x | 3 | 3 | 2 | 2 |
| Ethylene Converted, Percent | 32 | 94 | 100 | 88 | 69 | 84 | 51 |
| Alkylate (Wt. Percent) [1]: | | | | | | | |
| Isopentane | | | 15 | 15 | 22 | | |
| Hexanes | 31 | 99 | 9 | 75 | 47 | 87 | 29 |
| $C_7+$ | 11 | 80 | 47 | 52 | 58 | 52 | 22 |
| Total ($C_5$ Free) | 42 | 179 | 56 | 127 | 105 | 139 | 51 |

[1] Based on ethylene charged.

amount in excess of about 1 mole per mole of water of hydration in said salt, at a temperature between about −30° C. and a temperature substantially below the temperature at which said hydrate salt decomposes, and at a pressure sufficient to maintain a substantial portion of said reactants in the liquid state, and separating a hydrocarbon product mixture containing alkylate product of said feed hydrocarbon and said olefin.

2. An alkylation process wherein an isoparaffin having from 4 to 8 carbon atoms and an olefin having from 2 to 12 carbon atoms are contacted, in a molar ratio of isoparaffin to olefin between about 2 and 50, at a temperature between about −20° C. and 150° C. and a pressure between about 100 and 2000 p. s. i., said pressure being at least sufficient to keep a substantial portion of said reactants in the liquid state, for a time sufficient to permit an appreciable amount of alkylation reaction to take place, in the presence of a catalyst comprising essentially (i) a metal stannate salt containing water of hydration, the metal ion component being selected from the class consisting of bismuth, cadmium, calcium, cobaltous, ferric, magnesium, manganous and nickelous, and (ii) boron trifluoride, said $BF_3$ being present in an amount in excess of one mole per mole of hydrate water present in said salt, removing a product hydrocarbon mixture from said contacting zone and an alkylate hydrocarbon product is separated from said mixture.

3. The process of claim 2 wherein said isoparaffin is isobutane.

4. The process of claim 2 wherein said isoparaffin is diisopropyl.

5. The process of claim 2 wherein said olefin is ethylene.

6. The process of claim 2 wherein said olefin is propylene tetramer.

7. The process of claim 2 wherein said salt is bismuth stannate.

8. The process of claim 2 wherein said salt is nickelous stannate.

9. The process of claim 2 wherein said salt is cobaltous stannate.

10. The process of claim 2 wherein said temperature is between about 25° C. and 40° C.

11. The process of claim 2 wherein the $BF_3$ is present in an amount, in excess of 1 mole per mole of hydrate water, such that the free-$BF_3$ to olefin weight ratio is between about 0.2 and 1.5.

12. An alkylation process which comprises contacting isobutane and ethylene in a molar ratio of isobutane to ethylene between about 2 and 25 at a temperature between about −20° C. and 100° C. at a pressure between about 200 and 1000 p. s. i., said pressure being sufficent to keep a substantial portion of said reactants in the liquid state for a time sufficient to permit an appreciable amount of alkylation reaction to take place, in the presence of a catalyst pair comprising essentially (a) a salt-$BF_3$ complex consisting of a metal stannate salt containing water of hydration, the metal ion component being selected from the class consisting of bismuth, cadmium, calcium, cobaltous, ferric, magnesium, manganous and nickelous, and about 1 mole of $BF_3$ per mole of hydrate water present in said salt and (b) boron trifluoride in an amount such that the weight ratio of free-$BF_3$ to ethylene charged is at least about 0.2, removing product hydrocarbon mixture containing alkylate product from said contacting zone and separating alkylate hydrocarbon product from unreacted isobutane and ethylene.

13. The process of claim 12 wherein said temperature is between 25° C. and 40° C.

14. The process of claim 12 wherein said free-$BF_3$/ethylene weight ratio is between about 0.35 and 1.

No references cited.